A. COOKE.
Velocipedes.

No. 152,214.  Patented June 23, 1874.

Attest.  Inventor.

UNITED STATES PATENT OFFICE.

AUGUSTUS COOKE, OF CINCINNATI, OHIO, ASSIGNOR OF ONE-HALF HIS RIGHT TO LEWIS C. HOPKINS, OF SAME PLACE.

IMPROVEMENT IN VELOCIPEDES.

Specification forming part of Letters Patent No. 152,214, dated June 23, 1874; application filed May 7, 1874.

*To all whom it may concern:*

Be it known that I, AUGUSTUS COOKE, of Cincinnati, in the county of Hamilton and State of Ohio, have invented certain Improvements in Pleasure-Vehicles, of which the following is a specification:

My invention relates to pleasure-vehicles, which are driven by the person riding therein by means of a rocking seat, which is connected to the driving-wheels by suitable mechanism, so that the rocking of the seat may propel the vehicle. I am aware that a pleasure-vehicle has been driven by a chair, the rockers of which are secured rigidly at one point, and on which, as a fulcrum, the chair is vibrated. My improvements, however, consist, first, in connecting the arm of the seat directly with the driving-wheels, by forming a projection on the arm to extend over the wheel, and attaching to this a connecting-rod, which is also connected directly with the wheel; second, in a peculiar arrangement for connecting the rocker with the body of the vehicle, whereby the seat may rock or roll forward and backward upon the rockers, instead of vibrating on a fixed fulcrum; third, in a peculiar arrangement for guiding the vehicle.

Figure 1:
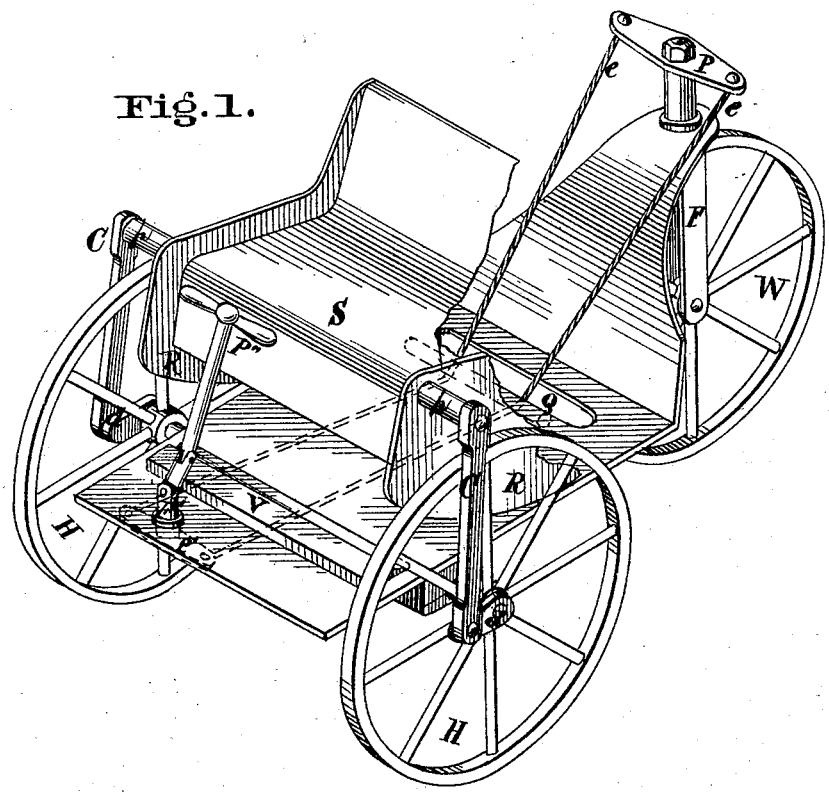
Figure 2:
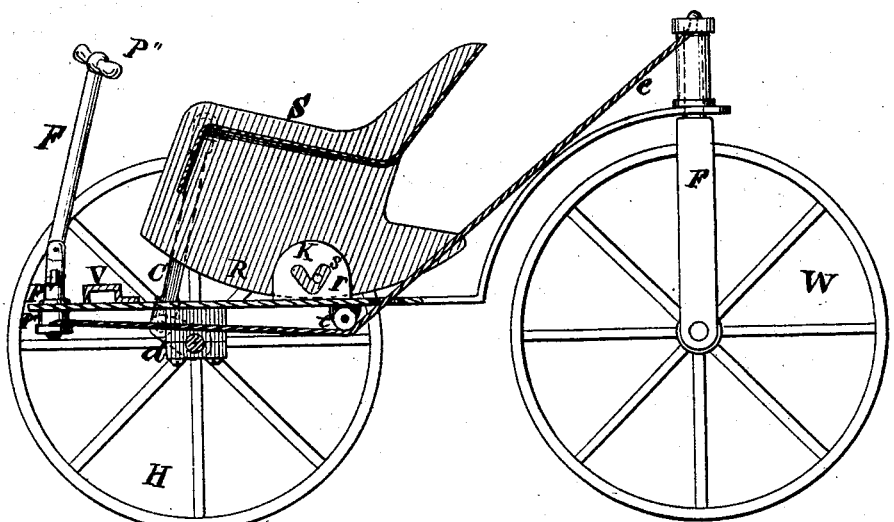

In the drawing, Figure 1 is an elevation, in perspective, of a vehicle containing my improvements. Fig. 2 is a sectional elevation taken longitudinally through the center of the vehicle.

In the drawing, S is the seat, which may be made of wood or metal, and of any desired width, though most convenient when it nearly fills the space between the wheels, in which case it will usually accommodate two persons. This seat is provided with two rockers, R R, which may be of any desired construction, but should be attached firmly to the seat. The rockers have a bolt, $r$, fitted to play in the slot $s$ in the lugs K. These lugs K are on either side of the body of the vehicle, and attached firmly thereto. The slot $s$ in them is formed in such a curve that, when the seat rocks forward on its rockers, the bolt will follow in the slot. Thus the bolt serves to keep the seat in position, yet holds it in such a manner that it may rock freely on its rockers, the weight resting on the rockers instead of the bolt. This causes a shifting of the fulcrum, so that the vehicle can be much more easily propelled than if the fulcrum were fixed at one point, there being greater purchase. To the upper front part of the arm of each seat is secured a projection or short shaft, $p$, on the end of which works the connecting-rod $c$. The other end of the connecting-rod is attached to the crank $d$, which is securely attached to the driving-wheel H. Instead of crank $d$, the connecting-rod may be attached directly to a crank-pin secured to the spokes a little distance from the wheel. The guiding-wheel W is in the rear of the seat, and runs in the forked standard F. To the top of this standard is secured the cross-piece P, at each end of which is attached a tiller-rope, $e$. These ropes pass through slots Q in the bottom of the vehicle, and under the pulleys $t$ to the front of the vehicle, where they are attached to the cross-piece P', which is secured just beneath the floor of the vehicle to the standard F', which is held in its place in a socket in the floor of the vehicle by a ring above the floor. In this socket the standard turns freely. Just above the ring, and a short distance from the floor, there is a double joint formed in the standard, so that it may be moved forward or back, to the right or left, and in any position will still, by means of the cross-bar P'', turn wheel W, and thus guide the vehicle. V is a foot-rest secured to the bottom of the vehicle, against which the operator may brace when driving the vehicle.

What I claim is—

The combination, in velocipedes, of seat S, having rockers R and lug L, with the bolt $r$, having slots $r'$, as and for the purposes set forth.

AUGUSTUS COOKE.

Witnesses:
 JOHN E. HATCH,
 ROBT. H. PARKINSON.